No. 875,972. PATENTED JAN. 7, 1908.
A. WESSEL.
VESSEL FOR COOKING AND LIKE PURPOSES.
APPLICATION FILED MAY 24, 1906.

2 SHEETS—SHEET 1.

Witnesses: Inventor:
August Wessel
By Knight Bros.
Attorneys

No. 875,972.
PATENTED JAN. 7, 1908.
A. WESSEL.
VESSEL FOR COOKING AND LIKE PURPOSES.
APPLICATION FILED MAY 24, 1906.
2 SHEETS—SHEET 2.
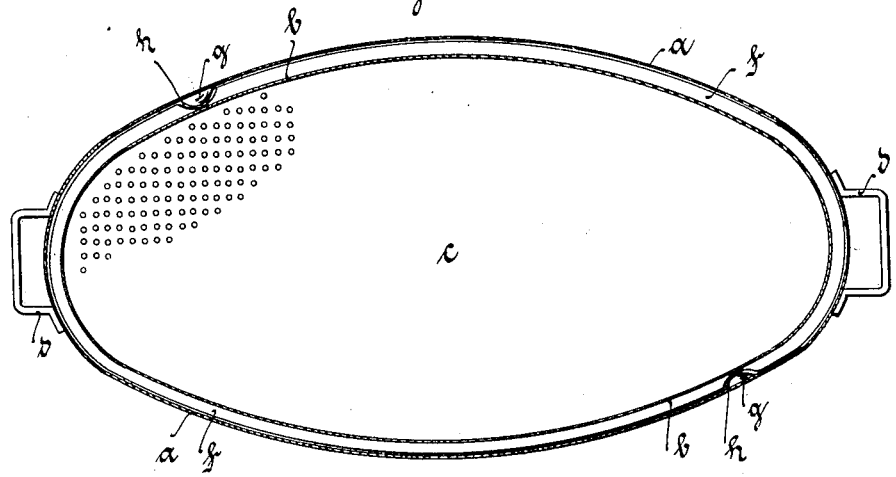
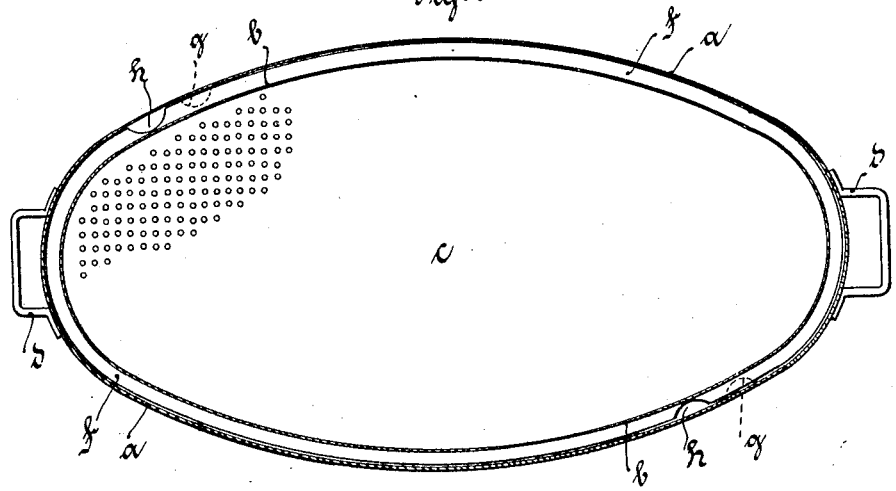
Witnesses:
Inventor:

UNITED STATES PATENT OFFICE.

AUGUST WESSEL, OF HANOVER, GERMANY, ASSIGNOR TO VERTRIEBSCENTRALE FÜR HAUSHALTSARTIKEL (TRIEBERT & WESSEL) G. M. B. H., OF HANOVER, GERMANY.

VESSEL FOR COOKING AND LIKE PURPOSES.

No. 875,972.    Specification of Letters Patent.    Patented Jan. 7, 1908.

Application filed May 24, 1906. Serial No. 318,493.

*To all whom it may concern:*

Be it known that I, AUGUST WESSEL, a subject of the German Emperor, residing at Hanover, in the German Empire, have invented certain new and useful Improvements in Vessels for Cooking and Like Purposes, of which the following is a specification.

My invention relates to cooking vessels of the well known kind having a removable inner receptacle, and has for its object the construction of a vessel of that character which will possess durability, simplicity and inexpensiveness.

My invention comprises an outer receptacle of annular or other suitable shape provided with convexo-concave beads or projections formed in the wall thereof, and projecting beyond its inner surface near to the top of the vessel. Removably mounted and centrally arranged within this outer receptacle is an inner receptacle which is spaced from the outer receptacle and provided at the bottom with a downwardly flaring peripheral skirt or flange of the same area, approximately, as and occupying the space between the receptacles and adapted to rest on the beads or projections of the outer receptacle for the purpose of supporting the inner receptacle in elevated position; the skirt or flange being also provided with peripheral notches to enable the skirt or flange to pass the beads or projections and rest in normal or lowered position on the bottom of the outer receptacle.

I will now describe my invention with reference to the accompanying drawings and then point out the distinctive features thereof in the annexed claims.

Figure 1:
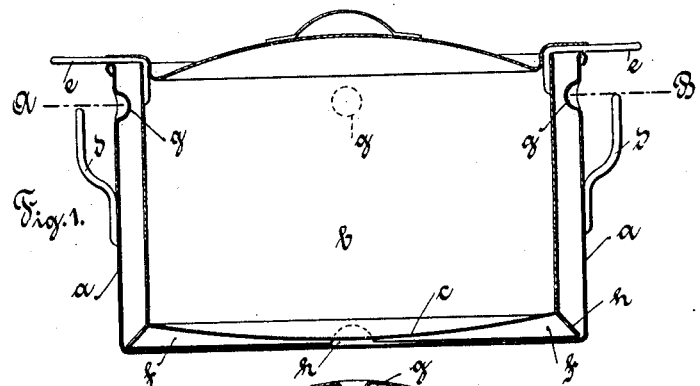
Figure 2:
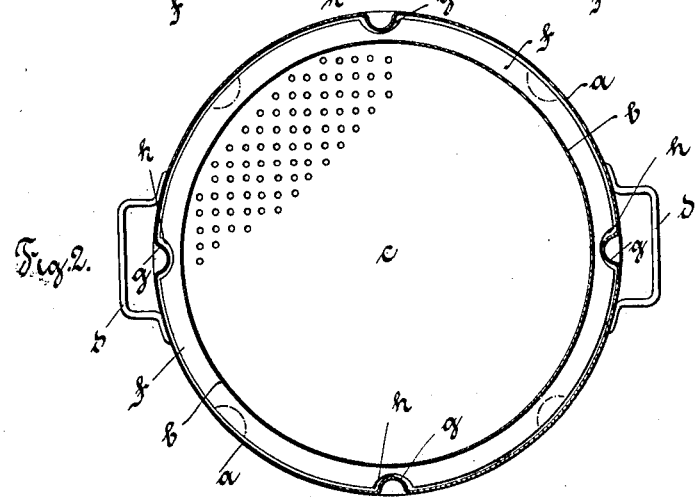
Figure 3:
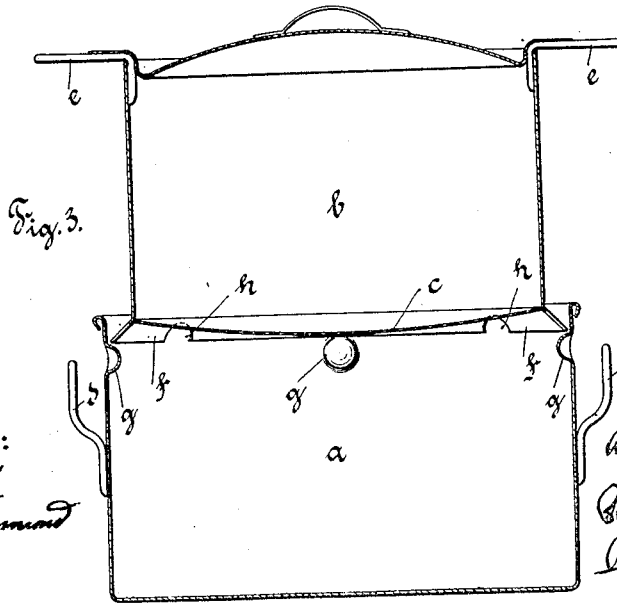

Figure 1 is a vertical section of my improved vessel showing the inner receptacle in normal or lowered position. Fig. 2 is a horizontal section on the line A B of Fig. 1. Fig. 3 shows the inner receptacle in raised position and resting on the beads or projections of the outer receptacle. Figs. 4 and 5 are horizontal sections of an elliptical or oval shaped vessel showing the inner receptacle in normal or lowered and raised positions respectively.

The outer receptacle $a$ may be made of any suitable material, such as sheet or galvanized iron, etc., in annular or other desired form. Formed in the wall and projecting beyond the inner surface of the outer receptacle $a$ are a plurality of beads or projections $g$, of convexo-concave form.

$b$ is a removable inner receptacle of smaller diameter than the outer receptacle $a$ which is centrally positioned within the outer receptacle $a$ and is provided with a perforated convexo-concave bottom $c$.

Projecting downwardly from the bottom of the inner receptacle $b$ is a peripheral flaring skirt or flange $f$ of the same area, approximately, as and occupying the space between the outer and inner receptacles and provided with notches $h$, corresponding in number with and slightly larger than the beads or projections $g$. The outer receptacle $a$ is provided with handles $d$ for transportation purposes.

$e$ are handles secured to the inner receptacle $b$ by means of which the same is raised or lowered. The inner receptacle $b$ may be provided with a cover or lid if desired.

It will be observed that it will be impossible to withdraw the inner receptacle from the outer receptacle unless the inner receptacle is revolved until the notches in the skirt or flange register with the beads or projections $g$. After raising the inner receptacle $b$ above the beads or projections, the inner receptacle may be again revolved to throw the notches out of register with the beads or projections which will then engage the flange and support the inner receptacle. When in raised position the flange will form a cover or closure so that only an inconsiderable quantity of heat will escape from the outer receptacle. This insures a uniform temperature within the outer receptacle at all times.

When an irregular shaped vessel is employed the notches are located in the flange in proximity to the beads or projections which are located at different distances from the ends of the outer receptacle so that a slight rotary movement of the inner receptacle changing it end for end will throw the notches into or out of register with the beads or projections. In a vessel of annular form it is desirable to have the beads or projections located diametrically opposite each other.

My invention is not limited to cooking vessels but the vessel may be constructed for sterilizing surgical instruments, pasteurizing, and similar purposes.

The inner receptacle is spaced from the outer receptacle by the peripheral downwardly flaring skirt or flange so that a water chamber is provided between the inner receptacle and the outer receptacle. The perforated bottom of the inner receptacle being of convexo-concave shape its central part is in a position contiguous to the bottom of the vessel.

What I claim as new therein and desire to secure by Letters Patent is:

1. A vessel comprising an outer receptacle having projections on the inner side of the wall adjacent to the top thereof, and an inner receptacle, centrally positioned within and spaced from the outer receptacle and provided with a peripheral flange located at the bottom thereof and of the same area, approximately, as and occupying the space between the outer and inner receptacles, whereby it is supported on the projections in raised position, the peripheral flange having notches in it in positions which correspond to the projections so that in certain relative positions of the two receptacles the notches register with the projections and enable the inner vessel to pass the projections.

2. A vessel comprising an outer receptacle having convexo-concave inwardly extending projections formed in the wall adjacent to the top thereof, and an inner receptacle, centrally positioned within and spaced from the outer receptacle and provided with a peripheral flange located at the bottom thereof and of the same area, approximately, as and occupying the space between the outer and inner receptacles, whereby it is supported on the projections in raised position, the peripheral flange having notches in it in positions which correspond to the projections so that in certain relative positions of the two receptacles the notches register with the projections and enable the inner vessel to pass the projections.

3. A vessel comprising an outer receptacle having projections on the inner side of the wall adjacent to the top thereof, and an inner receptacle, centrally positioned within and spaced from the outer receptacle and provided with a downwardly flaring peripheral flange located at the bottom thereof and of the same area, approximately, as and occupying the space between the outer and inner receptacles, whereby it is supported on the projections in raised position, the peripheral flange having notches in it in positions which correspond to the projections so that in certain relative positions of the two receptacles the notches register with the projections and enable the inner vessel to pass the projections.

4. A vessel comprising an outer receptacle having convexo-concave inwardly extending projections formed in the wall adjacent to the top thereof, and an inner receptacle, centrally positioned within and spaced from the outer receptacle and provided with a downwardly flaring peripheral flange located at the bottom thereof and of the same area, approximately, as and occupying the space between the outer and inner receptacles, whereby it is supported on the projections in raised position, the peripheral flange having notches in it in positions which correspond to the projections so that in certain relative positions of the two receptacles the notches register with the projections and enable the inner vessel to pass the projections.

In testimony whereof I hereunto affix my signature in presence of two witnesses.

AUGUST WESSEL.

Witnesses:
  GUSTAV TRIEBERT,
  LEONORE RASCH.